(12) United States Patent
Stoppek et al.

(10) Patent No.: US 6,318,241 B1
(45) Date of Patent: Nov. 20, 2001

(54) PISTON FOR A HYDROSTATIC CYLINDER BLOCK

(75) Inventors: Robert J. Stoppek, Ames, IA (US); Mark A. Landwehr, Cicero, IN (US)

(73) Assignee: Sauer-Danfoss Inc., Ames ( * ) Notice: Subject to any disclaimer, the term of this patent is extended or adjusted under 35 U.S.C. 154(b) by 0 days.

(21) Appl. No.: 09/519,039

(22) Filed: Mar. 3, 2000

Related U.S. Application Data (63) Continuation-in-part of application No. 09/514,094, filed on Feb. 28, 2000.

(51) Int. Cl.⁷ .............................. F01B 31/00; F16J 1/00
(52) U.S. Cl. ................................. 92/181 R; 92/260
(58) Field of Search .......................... 92/255, 256, 257, 92/258, 259, 181 R, 260; 29/888.042

(56) References Cited

U.S. PATENT DOCUMENTS

| | | | |
|---|---|---|---|
| 2,980,077 | * 4/1961 | Magill | 92/255 X |
| 3,187,644 | 6/1965 | Ricketts . | |
| 3,319,575 | * 5/1967 | Havens | 92/255 X |
| 3,707,113 | 12/1972 | Hein et al. . | |
| 3,741,077 | 6/1973 | Hulsebus et al. . | |
| 3,783,749 | * 1/1974 | Cunningham et al. | 92/255 |
| 3,828,654 | * 8/1974 | Wiethoff | 92/255 |
| 3,896,707 | 7/1975 | Holmstrom . | |
| 3,915,071 | * 10/1975 | Forster | 92/255 X |
| 3,915,074 | 10/1975 | Bristow et al. . | |
| 3,984,904 | 10/1976 | Schlecht . | |
| 3,986,439 | 10/1976 | Ring . | |
| 3,999,468 | 12/1976 | Bristow et al. . | |
| 4,478,130 | * 10/1984 | Brenner et al. | 91/6.5 |
| 4,494,448 | 1/1985 | Eystratov . | |
| 4,519,300 | 5/1985 | Adomis, Jr. et al. . | |
| 5,007,332 | * 4/1991 | Wagenseil | 92/255 X |
| 5,072,655 | 12/1991 | Adler . | |
| 5,076,148 | * 12/1991 | Adler | 29/888.042 X |
| 5,216,943 | * 6/1993 | Adler et al. | 29/888.042 X |
| 5,435,234 | * 7/1995 | Bentz et al. | 92/255 X |
| 5,490,446 | 2/1996 | Engel . | |
| 5,553,378 | * 9/1996 | Parekh et al. | 29/888.042 X |
| 5,642,654 | * 7/1997 | Parekh et al. | 92/260 |

* cited by examiner

*Primary Examiner*—John E. Ryznic
(74) *Attorney, Agent, or Firm*—Zarley, McKee, Thomte, Voorhees & Sease (57) ABSTRACT

A piston for use in the cylinder block of a hydraulic power unit. The piston has an elongated cylindrical body and one end terminating in a spherical surface. The piston is composed of a body and insert which are made from different materials, preferably metallic materials, and joined together. The piston body takes the form of a solid cylinder or a hollow cylindrical tube. The spherical surface takes the form of an internal spherical socket or an external spherical ball. The insert takes an elongated or abbreviated form providing for both open cavity and closed cavity piston configurations. The piston includes a conduit which traverses the body and insert, providing a path for pressurized fluid. The body and the insert are preferably formed by a metal injecting molding process utilizing a molding material comprised at the time of molding of a mixture of metallic grains and a binder. The body member and the insert are subjected to a debinding process whereupon the binder material is removed from the molding material and the components are sintered whereupon controlled shrinking occurs. The insert is adapted to terminate either in a spherical ball for attachment to a slipper element, or is comprised of a spherical socket adapted to receive a ball element attached to a slipper element.

15 Claims, 6 Drawing Sheets

PISTON FOR A HYDROSTATIC CYLINDER BLOCK

CROSS-REFERENCE TO RELATED APPLICATIONS

This application is a Continuation-In-Part of Ser. No. 09/514,094 filed Feb. 28, 2000.

BACKGROUND OF THE INVENTION

This invention relates to hydraulic power units of the type which incorporate a cylinder block containing reciprocating pistons which, through pivotally attached slippers, are in operational engagement with a swashplate. Such hydraulic power units may operate as either pumps or motors. Specifically this invention is concerned with an improved piston for use in such hydraulic power units.

Typically, the pistons that are utilized in hydraulic power units of the aforementioned type have been manufactured from a metallic material, usually steel, which is heat treated. The particular material and heat treatment process utilized are selected to provide adequate structural strength and wear properties necessary for appropriate piston function and life. Closed end hollow pistons are shown in U.S. Pat. No. 3,319,575. Fluid conduits extending the length of the piston are shown in both the U.S. Pat. No. 3,319,575 and also in U.S. Pat. No. 3,882,762.

Because the piston interacts dynamically with both the cylinder block and the slipper-to-swashplate connection which present different loading and wear challenges to the piston, it has been determined that the material property requirements of the piston are not necessarily uniform throughout the entire structure of the piston. For this reason, it is advantageous to provide a piston which is made up of more than a single material so that various structural elements of the piston may possess different strength and wear properties in its final form.

Generally, it has been determined that the cylindrical body of the piston which is in reciprocating contact with the bore of the cylinder block requires strength and surface wear properties necessitating the use of hardened medium carbon steel. The end of the piston which is connected to a slipper through a spherical joint is subject to compressive rotary and pivotal motion and does not require the extreme strength and wear properties of the cylindrical body. The spherical end of the piston can provide satisfactory function and life when formed of low carbon steel which is not hardened.

Additionally, it is often advantageous for the spherical end of the piston to remain malleable to crimping of the end to retain the slipper to the piston in an assembled condition.

Some hydraulic pistons used in a cylinder block of a hydrostatic power unit are of solid steel construction. While they are durable, reliable, and inexpensive to make, their relative greater weight imposes limitations on their speed of operation. They also develop more operational frictional forces.

Alternatively such pistons are constructed with a hollow cavity therein to reduce the weight of the solid steel pistons. However, the hollow cavities become filled with oil which is compressible. The resulting compression and de-compression of the oil within the piston cavity during pressure cycles results in inefficient energy consumption and has an adverse affect on the moments of inertia imposed on the swashplate with which the pistons interact.

The shortcomings of the hollow pistons are overcome in part by pistons which fill the hollow cavity with a plastic material which is lightweight and which is not as compressible as oil. However, it is difficult to get reliable material that can endure the harsh environment of the pistons whereupon deterioration of the plastic material is common. Aluminum slugs in the cavity instead of the plastic material are more durable, but they are difficult to retain within the cavity.

Some pistons provide a hollow cavity with a cap on one end to close the cavity. Oil does not dwell within the cavity because a hollow tube extends through the piston and through the cavity to prevent the cavity from becoming filled with oil. The tubes within the cavity are often reinforced by a washer or the like which spans the distance from the outer diameter of the tube to the inner diameter of the cavity. While pistons of this design solve at least some of the problems outlined heretofore, they are very expensive to make.

Therefore, a principal object of this invention is to provide a closed cavity hydraulic piston and a method of making the piston which is economical of manufacture and which overcomes the above-described shortcomings of existing pistons.

More specifically, it is an object of this invention to provide a closed cavity hydraulic piston which has a hollow piston body with a piston insert thereon which are both formed by a metal injection molding process.

A further object of this invention is to provide a closed cavity hydraulic piston and method of manufacture which provides for adhering the insert to the piston body while simultaneously hardening the piston body and leaving the insert malleable for crimping or swaging, or vice versa.

A further object of this invention is to provide a closed cavity hydraulic piston wherein oil conduits are formed separate from the cavity wherein the insert is adhered to the piston body.

A still further object of this invention is to provide a closed cavity hydraulic piston and method of making the same which will essentially eliminate finishing operations through the fabrication of the body and the insert by a metal injection molding process.

A still further object of the invention is to provide a hydraulic piston which is quiet in operation, capable of being operated at high speeds, energy efficient in operation, and inexpensive of manufacture.

It is a further object of this invention to provide a piston that is comprised of more than a single material.

Further, it is an object of this invention to form a piston from multiple parts, each part being of a different metallic material.

It is also an object of this invention to produce a piston which includes a hardened cylindrical body and a malleable spherical end.

It is a further object of this invention to provide a piston which incorporates a conduit traversing the body and the insert as a path to communicate pressurized fluid from the cylinder bore to the slipper and swashplate operative connection.

Additionally, it is an object of this invention to assemble the piston to a slipper for subsequent reciprocal operation in the bore of a cylinder block and operative connection with a swashplate in a hydraulic power unit.

These and other objects will be apparent to those skilled in the art.

SUMMARY OF THE INVENTION

A piston for a cylinder block of a hydraulic power unit has a cylindrical body and one end terminating in a spherical surface. The cylindrical body may take the form of either a solid cylinder or hollow cylindrical tube. The spherical surface may take the form of either an internal cavity or an external ball, and is integral to an insert which is made as a separate piece from the cylindrical body. The body and insert are joined together to produce a complete piston.

The body, either in its solid or hollow form is made from a medium or high carbon steel material. The material is suitable for hardening to provide high structural strength and surface wear properties. The cylindrical body is formed to include an internal seat at one end to accommodate the positioning and attachment of the insert.

The insert, either in its internal or external spherical form is made of low carbon steel material. The material is capable of being subjected to heat treatment operations and still remain malleable. The insert is in the form of a simple cap which can be joined to one end of the body. The insert may also alternatively be formed in an elongated shape which incorporates a circular disc extended from the spherical surface end by an adjoining tubular neck structure. This elongated insert is used in conjunction with the hollow body to form a piston with a closed internal cavity.

In all cases, the final piston incorporates a conduit which passes through the body and the insert. This passage is used to provide a path for pressurized fluid to flow from the pressurized cylinder bore in the cylinder block through the piston and the slipper to the operative connection with the swashplate.

The body and the insert are preferably formed by a metal injecting molding process utilizing a molding material comprised at the time of molding of a mixture of metallic grains and a binder material. The body member and the insert are subjected to a de-binding process whereupon the binder material is removed from the molding material and the components are then sintered, whereupon controlled shrinking occurs.

The insert is adapted to terminate either in a spherical ball for attachment to a slipper element, or is comprised of a spherical socket adapted to receive a ball element attached to a slipper element.

DESCRIPTION OF THE PREFERRED EMBODIMENT

Figure 1:
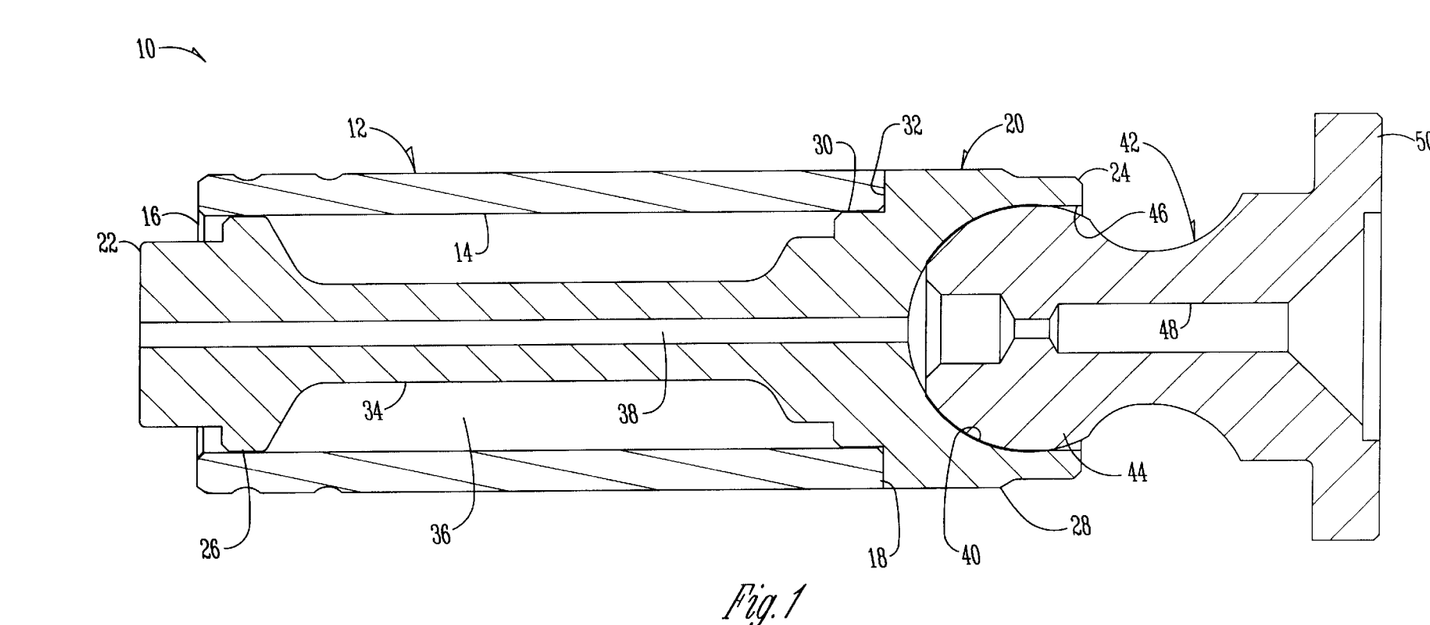
FIG. 1 is a longitudinal sectional view of the piston showing the hollow body, elongated insert with internal spherical socket end, and external spherical ball slipper.

With reference to FIGS. 1–6, corresponding elements have been identified with like numerals and/or sequential letter designations to facilitate understanding of the various invention embodiments that have been contemplated. The numeral 10 designates a piston which has a cylindrical body or sleeve 12 and a center bore 14. Sleeve 12 has a base end 16 and a head end 18. (FIG. 1).

An insert 20 is mounted within center bore 14 and has a base end 22 and a head end 24. An annular hub 26 is formed on the insert adjacent base end 22. Similarly, a head 28 is located on the head end 24. An annular groove 30 is formed in the head adjacent a vertical circular shoulder 32. A center or stem portion 34 with reduced diameter extends between the base end 22 and the head end 24. The reduced diameter center portion 34 creates an empty cavity 36 therearound in relation to the inner diameter of the center bore 14. An elongated conduit 38 extends along the center axis of the insert and terminates in a spherical socket 40 located in head 28.

As also shown in FIG. 1, a slipper 42 has a ball 44 which is rotatably received within socket 40. A thin edge 46 exists between the end 24 of insert 20 and the ball 44 and is adapted to be crimped inwardly towards the exterior surface of the ball to prevent the slipper from being longitudinally removed from the socket 40. The ball 44 is nevertheless rotatably mounted within the socket 40. A center elongated conduit 48 of any desired configuration extends from the inner end of conduit 38 longitudinally through a slipper 42, and terminates in a flat bearing surface 50 which is adapted to engage a conventional swashplate of a hydrostatic pump or motor.

The body 12 is preferably made from medium to high carbon metallic material (AISI 4140, for example). Insert 20 is made from low carbon metallic material (AISI 1010, for example).

Insert 20 is joined to the body 12 at hub 22. The insert is also secured to the body 12 at shoulder 32 adjacent head end 18. Brazing is used as the process to join and seal the body 12 with the insert 20. The piston 10 is subject to further heat treatment in a manner such that the body 12 is hardened and the insert 20 remains malleable. The brazing and hardening may be accomplished in a single heat cycle operation for simplified and economical manufacture.

Subsequently, piston 10 is assembled to slipper 42 such that external spherical ball 44 is seated within internal spherical socket 40, as described above. The edge 46 is thereupon crimped upon the ball 44 as described above. The resulting connection between piston 10 and slipper 42 allows rotary and pivotal freedom of motion between the two parts while preventing them from separating.

DESCRIPTION OF ALTERNATE EMBODIMENTS

It is further contemplated that the body and insert may be manufactured in slightly different shapes which will continue to embody the primary unique and advantageous features previously enumerated.

Figure 2:
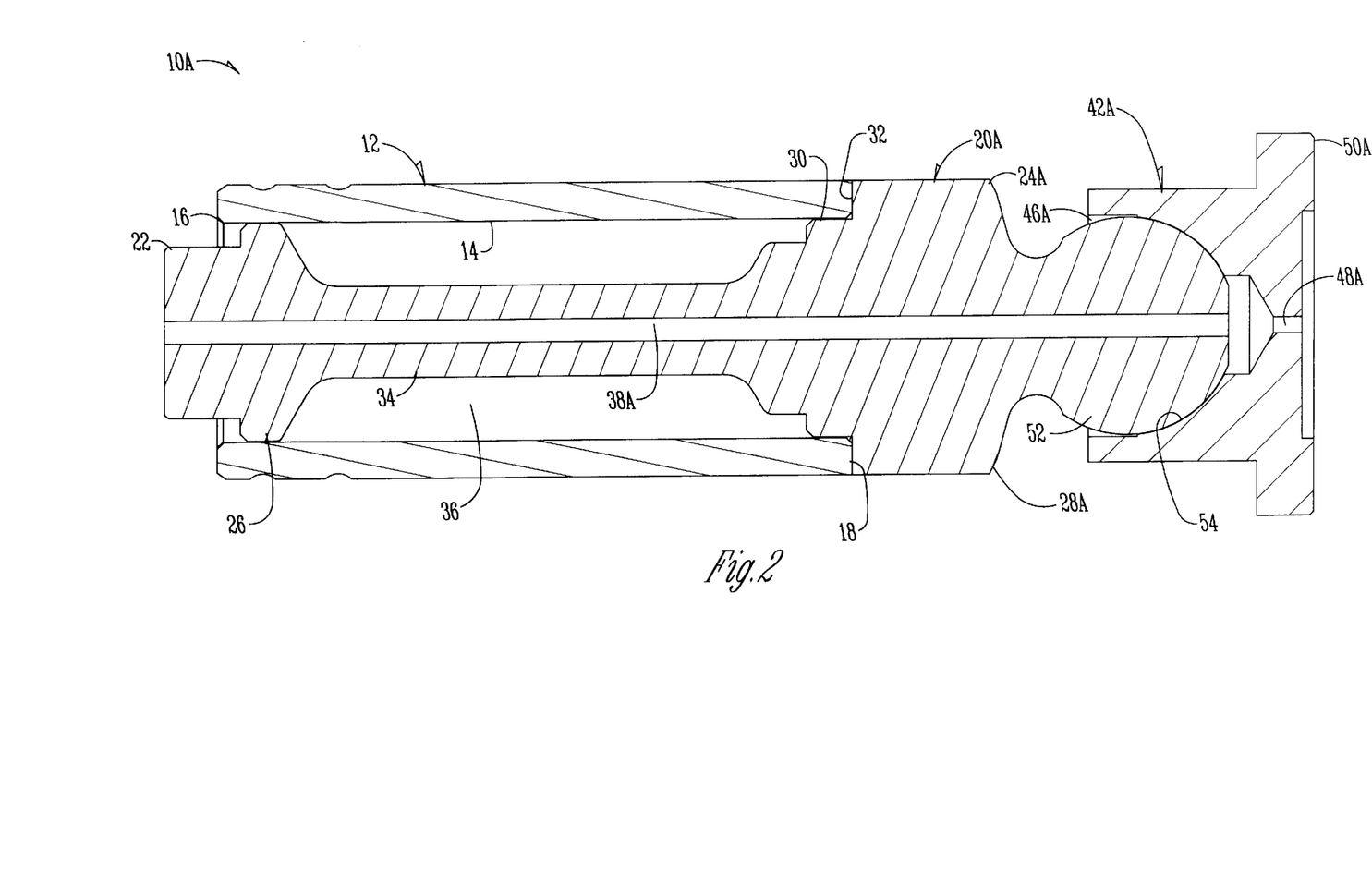
FIG. 2 is a longitudinal sectional view of an alternate piston showing the hollow body, elongated insert with external spherical ball end, and internal spherical socket slipper.

FIG. 2 illustrates an alternative piston 10A wherein the spherical surface formations on the piston and slipper are transposed. In this alternative design, insert 20A terminates in ball 52 which is received in socket 54 of slipper 42A. Again, assembly entails seating ball 52 within socket 54 and crimping edge 46A, as described in regard to the structure of FIG. 1. The remainder of the components as depicted I FIG. 2 are essentially identical to the above described components of FIG. 1. Conduit 38A extends through insert 20A and ball 52 to communicate with conduit 48A in slipper 42A.

Figure 3:
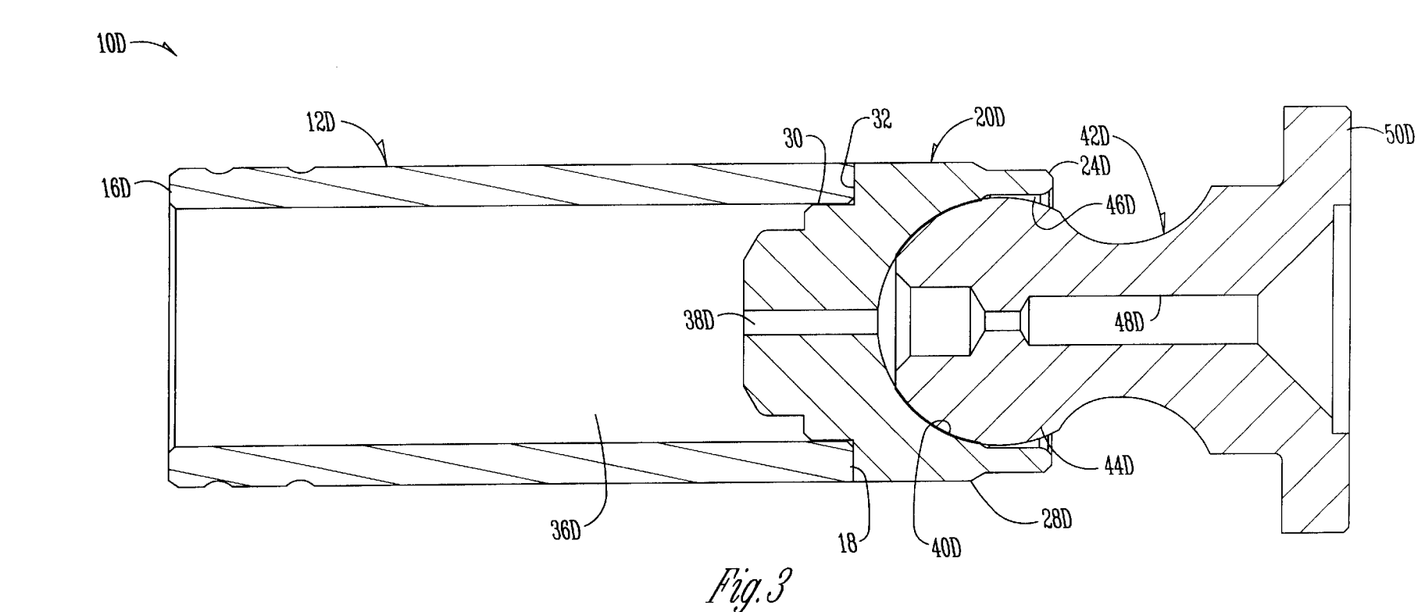
FIG. 3 is a longitudinal sectional view of a third alternate piston showing the hollow body, insert with internal spherical socket end, and external spherical ball slipper.
Figure 4:
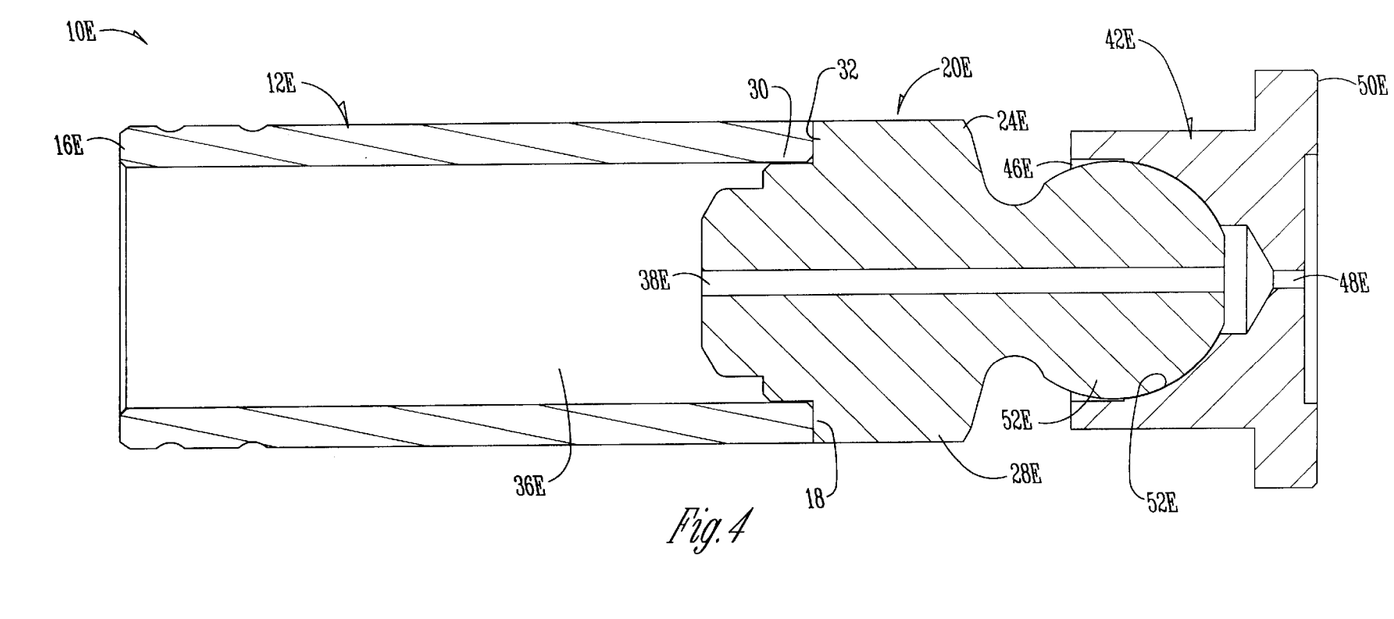
FIG. 4 is a longitudinal sectional view of a fourth alternate piston showing the hollow body, insert with external spherical ball end, and internal spherical socket slipper.

FIG. 3 and FIG. 4 illustrate another pair of piston configurations, 10D and 10E, respectively. In those alternatives, the bodies 12D and 12E are in the form of hollow cylinders with internal cavities. It can be clearly understood that all of the aforementioned features and characteristics are applicable to these variations as well. While different metals for body 12 and insert 20 are preferred, this invention is not limited thereto. The open cavity hollow pistons 10E and 10D of FIGS. 3 and 4 offer the advantage of reduced weight for certain hydraulic power unit applications.

Figure 5:
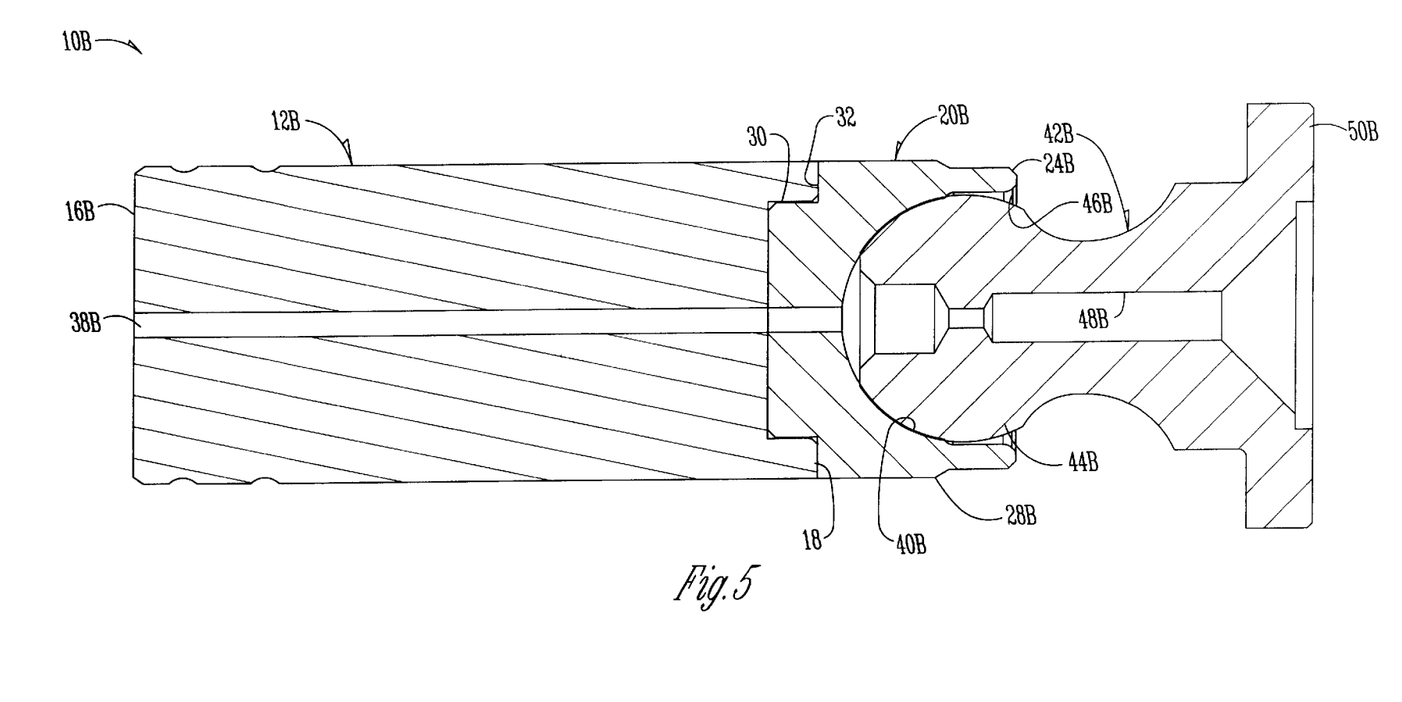
FIG. 5 is a longitudinal sectional view of a fifth alternate piston showing the solid body, insert with internal spherical socket end, and external spherical ball slipper.
Figure 6:
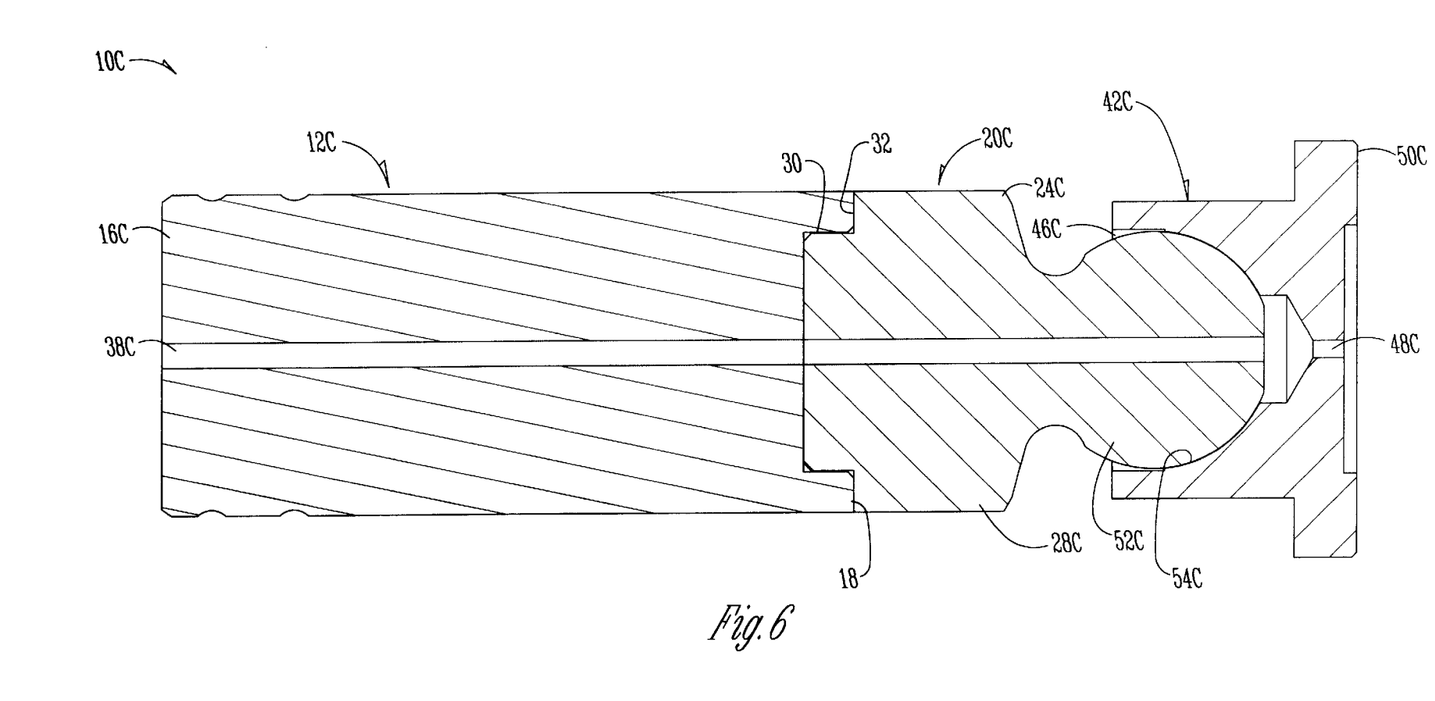
FIG. 6 is a longitudinal sectional view of a sixth alternate piston showing the solid body, insert with external spherical ball end, and internal spherical socket slipper.

FIG. 5 depicts an abbreviated insert 20B, which when assembled to solid cylindrical body 12B produces a substantially solid piston 10B. A small lubrication conduit 38B is optionally formed through the piston 10B. FIG. 5 further embodies an internal spherical socket 40B at the end of insert 20B, with corresponding external spherical ball 44B at the end of slipper 42B. Alternatively, FIG. 6 displays the equivalent substantially solid piston 10C with the spherical surfaces of the insert and slipper transposed whereby the end of insert 20C is external spherical ball 52C and internal spherical socket 54C is in the end of slipper 42C. A small lubrication conduit 38C is optionally formed through the piston 10C.

The bodies 12–12E and inserts 20–20E, according to this invention, are created by a process known as metal injection molding ("MIM"). This process is known in the metallurgical arts, but has not had application to the formation of hydraulic pistons. The inserts and the bodies can be joined through a batch brazing operation at temperatures where the piston body can be hardened by quenching to create wear properties, and the insert remains relatively malleable for the crimping operation discussed heretofore. The MIM process contemplates mixing fine grains of metal with a suitable binder. The bodies and caps would be molded in the shapes shown in the drawings. A typical system would involve assembling the two components using a braze media for the adhesive material. The assembled components would be brazed at a temperature of approximately 2050 F.° in a controlled atmosphere or vacuum; cooled to 1550 F.° to solidify the brazed medium; heat applied to stabilize the temperature at 1550 F.°; components may be quenched in gas, water, polymer or oil; washing the components (not required if vacuum brazed and gas quenched); and then tempering at a temperature of 350–400 F.°.

This process and design produces a piston that includes the following finished features: socket size and finish; balance groove; and hole through the piston. This process eliminates all expensive finishing operations.

What is claimed is:

1. A method of making a piston for a cylinder block of a hydrostatic power unit, comprising:

combining a quantity of small steel grains with a quantity of binder to create a molding material, forming out of the molding material an elongated cylindrical body having first and second ends with an elongated cavity in the body, forming out of the molding material an insert having a compatible shape for fitting in the body to close an open end of the cavity, with the insert having an external shape to facilitate the operative engagement thereof with a slipper and subsequent engagement with a swashplate mounted adjacent the cylinder block, removing the binder from the molding material, sintering and shrinking the body and the cap proportionally so that the cap can be fitted on the body, fitting the insert in the body to close the cavity in the body, and adhering the insert to the body.

2. A piston for a cylinder block of a hydrostatic power unit comprising:

an elongated cylindrical body having first and second ends and a center bore, an insert in the bore having first and second ends, the first end of the insert terminating in a spherical surface, the body being of a first metallic material and the insert being of a second and different metallic material, the body and the insert being joined together by brazing to form a cylindrical piston;

wherein the body and insert are made by a metal injection molding process utilizing a molding material comprised, at the time of molding, of a mixture of metallic grains and a binder;

wherein the first material has the properties of AISI 4140 and the second material has the properties of AISI 1010.

3. A piston for a cylinder block of a hydrostatic power unit comprising:

an elongated cylindrical metal injection molded body having opposite first and second ends with a center bore extending therebetween;

a metal injection molded insert having opposite first and second ends, the first end of the insert terminating in a spherical surface;

the body being formed of a first molded metallic material comprising at the time of molding a mixture of metallic grains and a binder and after molding having the metallurgical structure and properties of a metal injection molded component;

the insert being formed of a second and different molded metallic material comprising at the time of molding a mixture of metallic grains and a binder and after molding having the metallurgical structure and properties of a metal injection molded component; and the insert being sealingly joined to the first end of the body.

4. The piston of claim 3 wherein the piston is heat treated thereby hardening the metallic material of the body and leaving the metallic material of the insert malleable.

5. The piston of claim 3 wherein the body is a solid cylinder.

6. The piston of claim 3 wherein the body is a hollow cylindrical tube.

7. The piston of claim 3 wherein the insert includes an elongated stem connecting the first end and the second end thereof, the stem having a reduced diameter portion having a diameter less than a diameter of the center bore so as to create an empty internal cavity therearound, the body and the insert joined together to form a cylindrical piston having first and second ends of the insert joined and sealed to the ends of the body thereby closing the internal cavity.

8. The piston of claim 3 wherein the spherical surface forms an internal socket.

9. The piston of claim 3 wherein the spherical surface forms an external ball.

10. The piston of claim 3 including a conduit that extends the length of the body and the insert.

11. The piston of claim 3 wherein the body and the insert are joined by brazing.

12. The piston of claim 3 wherein the body and the insert are joined by brazing and heat treated in a single operation.

13. The piston of claim 3 wherein the body and the insert are joined by welding.

14. The piston of claim 3 wherein the insert has a head adjacent the first end of the insert, the head having an outer diameter larger than the center bore and terminating in first shoulder directed toward the second end of the insert, the first shoulder being supported by and sealingly joined to the first end of the body.

15. The piston of claim 3 wherein the insert is sealingly joined to the first end of the body by brazing.

* * * * *